United States Patent Office 2,947,603
Patented Aug. 2, 1960

2,947,603

NONCAKING ROCK SALT COMPOSITION

Howard C. Miller, Grand Saline, Tex., assignor to Morton Salt Company, Chicago, Ill., a corporation of Illinois No Drawing. Filed Feb. 21, 1957, Ser. No. 641,440

8 Claims. (Cl. 23—89)

This invention relates to the production of noncaking salt composition adapted for outdoor storage, and more particularly relates to noncaking rock salt compositions containing a pelletized admixture of salt and an anticaking agent, and to a method of preparing them. This invention also relates to a pelletized composition of salt and an anticaking agent.

One problem associated with the use of rock salt is that the crude granulated material in bulk form has a tendency while in outdoor storage to cake and fuse into a rigid mass which must be subsequently crushed to reduce the material into the more readily handled granular form. Crude rock salt is also known as the mineral halite and contains preponderantly sodium chloride with a small percentage of other salts such as magnesium chloride, calcium sulfate, etc., all of which are known and vary according to the particular character of the deposit. Generally rock salt crystallizes in a cubic system and accordingly when crude crushed rock salt is stored in the open, moisture in the form of rainfall or snow causes the formation of brine on the surfaces of the granules of rock salt which, on evaporation, crystallizes into salt bridges of the cubic system causing the familiar fusion into an intractable mass. As aforesaid, this problem has particular significance when the crude crushed rock salt is stored out of doors in large piles and subject to natural rainfall. Situations such as these occur at the site of mining and also when the highway departments of local governments store such rock salt for use in maintaining the highways clear of ice and snow. Accordingly, it would be desirable to produce a crude rock salt composition which remains free flowing during outdoor storage and exposure to the elements.

It is known that the application of certain chemicals to crude crushed rock salt causes the alteration of the crystalline habit of the salt from its usual cubic form to a dendritic crystal when brine formed on the surface from such salt recrystallizes. These dendritic crystals forming from brine on the surface of the rock salt granules and interconnecting the particles by bridges are weak and easily broken by slight pressure as opposed to the strong bridges of the cubic crystals. One such chemical used in the formation of dendritic crystals is potassium ferrocyanide which has the formula $K_4Fe(CN)_6 \cdot 3H_2O$. While applying ferrocyanide in powder to the upper surfaces of large outdoor storage piles of crude crushed rock salt or halite results in an initially noncaking mass, there are certain disadvantages to such a method. For example, the difficulty is encountered in applying the material to the piles and over prolonged outdoor storage the ferrocyanide or other anticaking agent has a tendency to leach out or wash down through the pile and permits the outer or upper layers of large salt piles which are then free from the ferrocyanide to further crystallize in their cubic form and fuse into a solid mass. It is also true that the ferrocyanide cannot be practicably mixed uniformly with the rock salt at the mine, since the relatively lower concentrations at the surface of the pile are even more rapidly leached away, causing fusion in an even shorter period.

Accordingly it is an object of the present invention to provide a free-flowing, noncaking crushed rock salt composition which has a prolonged outdoor storage life.

Another object is the production of a crude crushed rock salt composition in which an anticaking agent remains uniformly available and throughout the storage life of the salt pile.

Another object is to provide a crushed rock salt composition which remains free from surface caking over prolonged periods of outdoor storage.

Another object is the provision of a method whereby an anticaking material may be practically mixed with the crude crushed rock salt in a convenient form at the site of mining.

A still further object is the provision of a pellet adapted for use in preventing the caking of rock salt during outdoor storage.

These and other objects of the present invention will be seen in the following specification and claims.

Accordingly, in one broad form the present invention comprises a noncaking crushed rock salt composition adapted for outdoor storage comprising a crushed rock salt interspersed with pellets of an admixture of granulated sodium chloride and an anticaking agent. The present invention also relates to noncaking crushed rock salt compositions adapted for storage under outdoor conditions comprising a crude crushed rock salt or halite having disseminated throughout discrete pellets containing an admixture of salt and a ferrocyanide anticaking agent.

In the preferred form, the anticaking agent is potassium ferrocyanide, although other water soluble ferrocyanide salts such as sodium, calcium, ammonium, slightly soluble ferric ferrocyanide, or the like are useful. In the broader aspects of the present invention, anticaking agents other than ferrocyanide salts may also be used.

The form of incorporation of the ferrocyanide with the rock salt is an important aspect of this invention. As indicated, the potassium ferrocyanide or equivalent is incorporated into the crushed rock salt in the form of pellets. These pellets are prepared by conventional, well known pelletizing techniques which involve mixing a finely divided salt or more specifically sodium chloride with the desired amount of the finely divided ferrocyanide and compressing such mixture into a pellet. Generally the ratio of ferrocyanide to salt in the pellets may vary, but sufficient ferrocyanide should be utilized to be available as an anticaking agent during the natural dissolving of the pellet under outdoor storage conditions. Thus, a concentration of 20% ferrocyanide with 80% of sodium chloride is representative of the pelletizing composition. Concentrations may however vary, and broadly from about 4% to about 75% ferrocyanide may be incorporated into the salt pelletizing mixture. Binders are not necessary in preparing these pellets, although binders may be utilized if desired. The size of the pellets may range from about 5 grains to about 100 grains in weight. The shape of the pellets is not critical and various physical forms such as spherical, capsule shaped, cylindrical, cubical, annulated, etc., are contemplated.

The total amount of the anticaking agent such as ferrocyanide which is added to the crushed rock salt is variable according to degree of anticaking protection desired and will also vary with the size of the pellets. Generally, the amount of ferrocyanide present in relation to the total quantity of crude crushed rock salt to maintain it in a free flowing form may range from about 0.3 to about 0.005 percent or alternatively stated, from about 6 to about 0.1 pounds of ferrocyanide per ton of rock salt.

In the pelletized form the anticaking agent associated with the salt in the pellets will dissolve gradually when subjected to natural rainfall. The dissolving of salt in the pellets regulates the release of the ferrocyanide in that there remains some ferrocyanide present so long as any salt remains undissolved. Thus the beneficial effects obtained by the use of pellets as described in this invention are related to the maintaining of ferrocyanide or other anticaking agent distributed throughout the salt pile throughout the period of outdoor storage.

The method of preparing these noncaking rock salt compositions comprises mixing the pellets of anticaking agent with the crushed rock salt, preferably at the mine site and before shipment. Thus the pellets may be distributed or interspersed in the crushed rock salt in a portionwise manner as it leaves the crusher at the site of mining, before loading for transport or placing the same in temporary local storage.

It is also true that under certain conditions satisfactory results may also be obtained by distributing the pelletized anticaking composition in regions adjacent the surface of the rock salt pile during storage.

The following will illustrate one specific embodiment of the present invention:

PREPARATION OF NONCAKING CRUSHED ROCK SALT COMPOSITION

A pelletized salt tablet (approximately 50 grain size) was prepared containing 80 percent kiln dried granulated salt and 20 percent ground potassium ferrocyanide. For testing the effectiveness of these pellets in preventing the caking of salt stored outdoors 10 pounds of these pelletized tablets were added and mixed in one ton of mine run rock salt. This is a mixture of coarse and fine rock salt of the following approximate screening.

| Screen size: | Percent |
| --- | --- |
| 0.525 | 4.4 |
| 0.371 | 6.0 |
| 3 | 13.2 |
| 4 | 20.4 |
| 6 | 21.4 |
| 8 | 15.7 |
| 10 | 7.6 |
| 14 | 3.5 |
| 20 | 2.4 |
| Pan | 5.4 |

In order to compare this method of treating with untreated salt and with the same salt treated with two pounds of potassium ferrocyanide added to the top of the pile when stored outdoors, three one ton piles of mine run rock salt were set up and treated as indicated in Table I.

*Table I*

| Pile No. | Treatment |
| --- | --- |
| 1 | No treatment. |
| 2 | Two pounds of potassium ferrocyanide sprinkled over the top of pile. |
| 3 | 10 pounds of pelletized tablets containing 2 pounds of potassium ferrocyanide and 8 pounds of granulated salt mixed with rock salt. |

In order to speed up testing, a known amount of water was sprinkled on each pile periodically in addition to the natural rainfall and then checked for caking.

Accordingly during the test period the salt piles were subjected to natural and artificial rainfall in the amounts and intervals as follows:

| Second day | 1 inch of artificial rainfall. |
| --- | --- |
| Eighth day | 0.5 inch of artificial rainfall. |
| Eleventh day | 2 inches of artificial rainfall. |
| Fifteenth day | 0.5 inch of natural rainfall. |
| Twenty-fifth day | 2 inches of artificial rainfall. |
| Fiftieth day | 5.5 inches of natural rainfall. |

Examination of the salt piles on the fifty-fifth day showed the following results:

| Pile #1 | Very hard. |
| --- | --- |
| Pile #2 | Some surface caking. |
| Pile #3 | No caking. |

While the foregoing example is illustrative of a particular composition comprising a crushed rock salt and a pelletized admixture of a water-soluble ferrocyanide and a salt such as sodium chloride, it will be apparent that the procedures and inventive concepts therein set forth are broadly adaptable to the teachings of this invention. Thus other similar crushed rock salts containing granules of either a slightly coarser or finer character may be treated with advantage according to this invention and other ferrocyanides may be used in the pelletized composition in the same manner as the potassium ferrocyanide and of course the total amount of anticaking agent may readily be varied according to the degree of protection and freedom from caking desired.

In the foregoing example, while the distribution of potassium ferrocyanide in a powder form over the top of a rock salt pile results in a rock salt composition that is initially free from caking, in the latter stages of storage the leaching out of the anticaking agent becomes apparent when the surface of the pile starts to cake.

The composition of the present invention as shown in pile No. 3 shows some slight surface caking initially but after a prolonged storage (about 50 days) no caking was found showing the long term storage protection which is achieved by this novel composition.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A noncaking crushed rock salt adapted for outdoor storage comprising a crude crushed rock salt interspersed with pelletized mixtures of sodium chloride and a water dispersible alkali metal ferrocyanide.

2. The composition of claim 1 wherein the pellets contain from about 4 to 75 percent of a water dispersible alkali metal ferrocyanide.

3. The composition of claim 1 wherein the alkali metal ferrocyanide is present in the composition in a ratio of from about 0.1 to 6 pounds of a water dispersible alkali metal ferrocyanide per ton of rock salt.

4. The composition of claim 1 wherein said pellets contain from 5 to 100 grains of said admixture of sodium chloride and a water dispersible alkali metal ferrocyanide.

5. A noncaking rock salt composition adapted for outdoor storage comprising a crude crushed rock salt interspersed with pellets formed of a mixture of finely divided sodium chloride and a finely divided water dispersible alkali metal ferrocyanide, wherein said ferrocyanide is present in said rock salt composition in a ratio of approximately 2 pounds of ferrocyanide per ton of rock salt.

6. A process for preparing a crushed rock salt adapted for outdoor storage which comprises interspersing discrete pellets of a mixture of finely divided sodium chloride with a water soluble alkali metal ferrocyanide salt in a crude crushed rock salt.

7. The process of claim 6 wherein the pelletized ferrocyanide salt composition is interspersed in the rock salt in a ratio of from about 0.3 to 0.005 percent based on the total crude crushed rock salt.

8. A process for preparing a crushed rock salt adapted for outdoor storage comprising interspersing a pelletized admixture of a water soluble alkali metal ferrocyanide and sodium chloride, said pellets containing about 20 percent ferrocyanide and about 80% sodium chloride throughout a crushed rock salt.

References Cited in the file of this patent

UNITED STATES PATENTS

| | | |
|---|---|---|
| 352,465 | Hughes | Nov. 9, 1886 |
| 902,403 | Holloway | Oct. 27, 1908 |
| 1,140,995 | Miller | May 25, 1915 |
| 2,641,537 | Dunn et al. | June 9, 1953 |

FOREIGN PATENTS

| | | |
|---|---|---|
| 1,097,493 | France | Feb. 16, 1955 |

OTHER REFERENCES

Article in "Chemical Engineering," October 1951, issue entitled "Agglomeration," pages 163, 165.